Aug. 9, 1927.
W. P. MASON
1,638,777
HYDRAULIC SHOCK ABSORBER FOR MOTOR VEHICLES
Filed Oct. 23, 1926   2 Sheets-Sheet 1
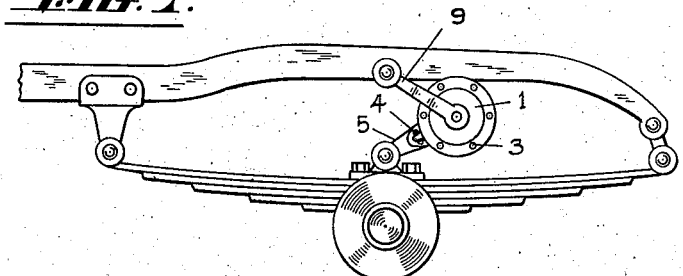
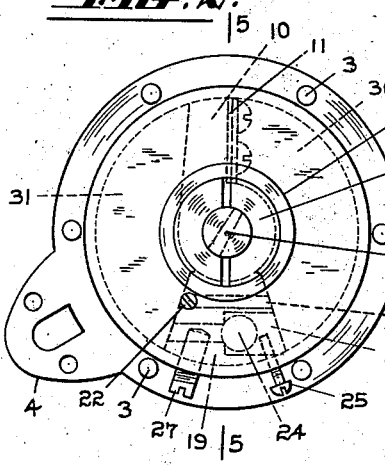
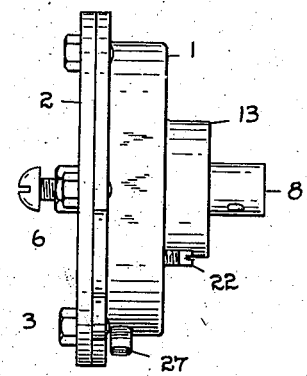
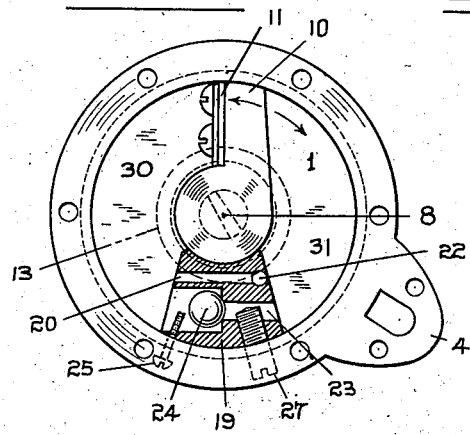
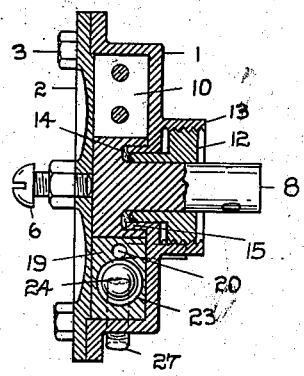
INVENTOR
WILLIAM P. MASON
BY *Munn & Co.*
ATTORNEYS Aug. 9, 1927.

W. P. MASON 1,638,777

HYDRAULIC SHOCK ABSORBER FOR MOTOR VEHICLES

Filed Oct. 23, 1926

INVENTOR
WILLIAM P. MASON
BY Munn&Co.
ATTORNEYS

Patented Aug. 9, 1927.

1,638,777

UNITED STATES PATENT OFFICE.

WILLIAM PATRICK MASON, OF NEW MILE END, SOUTH AUSTRALIA, AUSTRALIA, ASSIGNOR OF ONE-HALF TO NORMAN SAMUEL SPENCER, OF ADELAIDE, AUSTRALIA.

HYDRAULIC SHOCK ABSORBER FOR MOTOR VEHICLES.

Application filed October 23, 1926, Serial No. 143,662, and in Australia June 15, 1926.

The purpose of this invention is to provide an improved device in the form of an hydraulic shock absorber that not only will check the rebound of the spring of a motor vehicle as it comes back to normal position after displacement, but which, when desired, may be utilized to assist the spring to check the downward movement of the vehicle body. My device may be applied either to the front or to the rear axles and springs but is particularly designed for application to the rear axle and springs. A separate device may be applied to each spring, or one may be provided at the centre of the rear axle to control both springs.

My device comprises a circular drum, and a spindle mounted within and projecting from the centre of the drum and adapted to oscillate therein, the drum being fitted with a block having two through passages, the one a small one of adjustable bore and the other a large one fitted with a ball valve and with a device whereby it may be wholly or partially closed, and the central spindle carrying a plain radial plate. The block and the plate divide the interior of the drum into two chambers which vary in relative size as the spindle with the plate oscillates within the drum. The one chamber serves as a compression chamber, the other as a storage chamber.

Secured to and projecting from the drum and from the spindle are two arms the outer ends of which are pivotally attached respectively to the axle or to the spring and to the frame of the vehicle according to the construction of the vehicle and to the position of the device, so that as the axle and spring move up and down relatively to the frame the spindle and the drum oscillate relatively the one to the other.

In order that my invention may be the more clearly understood I will describe the same with reference to the accompanying drawings in which Fig. 1 is a side view showing portion of a chassis and a spring with my shock absorber attached thereto.

Fig. 2 is what may be called a front view of the preferred form of my device without the two arms whereby the drum and the spindle respectively are attached.

Fig. 3 is a side view of the device as shown in Fig. 2.

Fig. 4 is what may be called a rear view of the device with one member of the drum removed and showing a sectional view of the block forming part of the drum.

Fig. 5 is a cross section on line 5 5 of Fig. 2.

The circular drum may be constructed in various ways and I will first describe the construction shown in Figs. 2 to 5.

Figure 10:
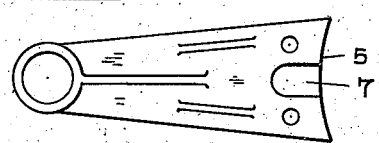
Figs. 10 and 11 show the two arms which are attached to and project from the drum and from the oscillatable spindle respectively.

According to this the drum comprises a short cylinder 1 closed at one end except for a central stuffing box through which the spindle passes and open and externally flanged at the other end, together with a cover 2, the cover being secured to the cylinder by setscrews 3. The cylinder 1 has a projecting perforated lug 4 to which is fastened by two bolts a projecting arm 5—see Fig. 10—whereby the drum is pivotally attached to the axle or to the spring of the vehicle, according to the positioning of the device. The arm 5 carries a small lug 7 which fits into the perforation in the lug 4.

Figure 11:
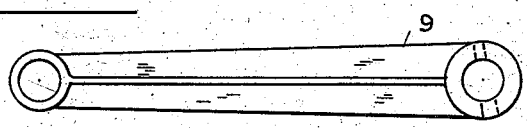

Centrally positioned within the cylinder 1 is the spindle 8 the one end of which fits neatly against the inner face of the cover 2 while its other end passes through the stuffing box in the end of the cylinder. A setscrew 6 at the centre of the cover 2 may be used to reduce the friction between the end of the spindle and the cover. Securely pinned or otherwise fastened upon the projecting end of the spindle 8 is an arm 9—see Fig. 11—the outer end of which is pivotally attached to the frame of the vehicle. Upon that portion of the spindle 8 within the drum is formed or rigidly secured a radial plate 10 to the face of which is fastened a packing strip 11 of flexible material the plate forming or serving as a radial piston. The spindle passes through a stuffing box comprising a bush or follower 12 having an externally screwthreaded head carried by an annular projection 13 upon the cylinder end and adapted to tighten the packing 14 in an annular recess cut in the spindle. Preferably this bush 12 is provided with a locking device—not shown—engaging the projection 13 so that it cannot be loosened by the oscillation of the spindle. A short bush or collar 15 projects inwardly from the cylinder end into this same recess and forms a guide about which the spindle oscillates.

Within the drum is a block 19 that is securely fastened thereto so that it moves with it and forms a fixed abutment across the space between the walls of the drum and the body of the spindle 8 which carries the radial plate 10. Through this block are two passages 20 and 23, the one 20 a comparatively small one which may be termed the release passage and the other 23 a relatively large one which may be termed the charging passage. At the outlet end of this charging passage 23 is a ball valve 24 held by a setscrew 25 or other retaining device in an enlarged portion of the passage. Into the release passage 20 there is cut from the outside of the drum a perforation which is screwthreaded and fitted with a setscrew 22 whereby the effective bore of the passage may be varied as desired. Into the charging passage 23 there is cut a perforation which is screwthreaded and fitted with a setscrew 27 which may be set to open or to close or to partially close the passage as desired.

I will now describe the operation of my device, the arrows in Fig. 4 indicating the direction of movement of the parts when checking a rebound.

The drum (that is the two chambers 30 and 31) having been filled with grease or with oil, the operation is as follows:—

When running over a smooth piece of road the arms 5 and 9 projecting from the drum 1 and from the spindle 8 respectively hold the spindle 8 and radial plate 10 in such position relatively to the drum that of the two chambers between the plate 10 and the block 19 the one behind the plate—the compression chamber 30—is of minimum capacity and the bulk of the grease is in the storage chamber 31. As the wheel strikes an obstruction and rises the spindle 8 with the plate 10 makes a partial rotation within the drum in the direction indicated by the arrow pointing to the right, the grease opening the ball valve 24 at the end of the passage 23 and passing from the storage chamber 31 into the compression chamber 30. So soon as the rebound commences the spindle 8 and plate 10 commence to move back as indicated by the arrow pointing to the left into normal position but, as the ball valve 24 at once closes the passage 23, the grease can pass only through the smaller or release passage 20 and consequently the movement between the spindle and the drum is slowed down and the rebound is checked and minimized.

If it should be desired to use the device to assist or supplement the springs it is necessary to close the larger or charging passage 23 by screwing in the setscrew 27. It is then necessary for the grease or oil to flow through the smaller passage 20 and either chamber becomes a compression chamber according to the movement of the vehicle body relatively to the wheels. The charging passage 23 may be partially closed only thereby allowing some of the grease or oil to flow through it.

Figure 6:
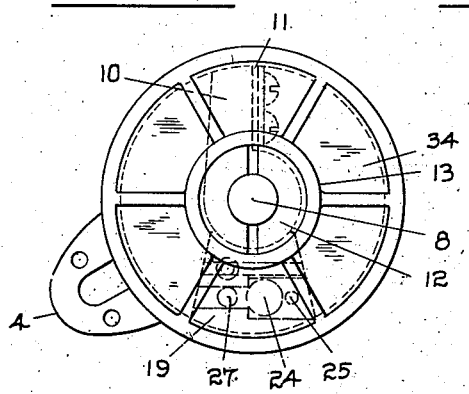
Figs. 6 and 7 are front and sectional views of a modified form of my device, the modification being mainly in the manner of construction of the drum.
Figure 7:
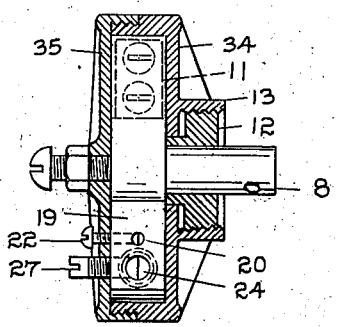

The construction of the device as shown in Figs. 6 and 7 is much the same as that already described except that the drum is formed by two short cylinders 34 and 35 projecting from two end plates, the one cylinder being internally screwthreaded and the other being externally screwthreaded so that the one screws into the other with a grease-tight joint. The two end plates preferably are provided with suitable projecting lugs 4 whereby they may be rigidly fastened together by bolts or other means, one of such lugs being of shape to take the arm 5 whereby it may be pivotally attached to the axle or to the spring according to the position of the device. In this construction the setscrews 22, 25 and 27 are carried in holes made through one of the end plates of the drum.

Figure 8:
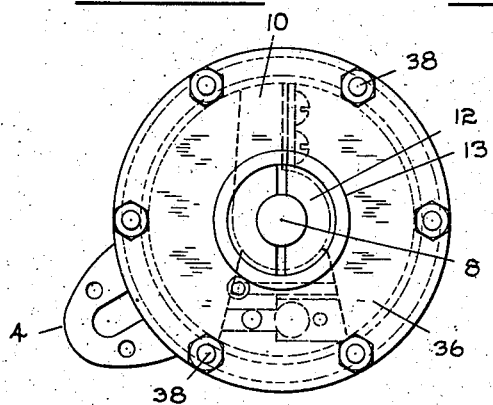
Figs. 8 and 9 are front and sectional views of a further modification of my device, the modification again being mainly in the manner of construction of the drum.
Figure 9:
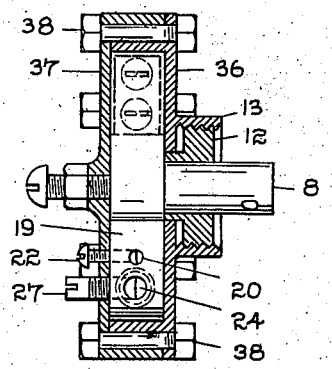

The construction of the device as shown in Figs. 8 and 9 is also substantially the same as that first described except that the drum is formed by two short cylinders 36 and 37 each open at the one end, the one fitting into the other and being held together by bolts 38. In this case also the setscrews 22, 25 and 27 are carried in holes made through one of the end plates of the drum.

What I claim is—

1. An hydraulic shock absorber comprising a circular drum and a spindle mounted within and projecting from the centre of the drum and adapted to oscillate therein, the drum having a perforated projection, a perforated block secured within the drum and forming an abutment therein, a radial plate secured upon the spindle and forming a radial piston, and removable arms adapted to be pivotally attached respectively to the axle or spring and frame, one arm being mounted on the spindle and the other provided with a lug fitting in the perforation of the projection of the drum and bolted to said projection.

2. An hydraulic shock absorber comprising a circular drum and a spindle mounted within and projecting from the centre of the drum and adapted to oscillate therein, projecting arms rigidly attached to the drum and to the spindle the outer ends of which are adapted to be pivotally attached respectively to the axle or to the spring and to the frame of the vehicle according to the construction thereof and to the position of the device, a block secured within the drum and forming a fixed abutment therein having two through passages the one a comparatively small one of adjustable bore and the other a relatively large one fitted with a valve and with a device whereby it may be wholly or partially closed, and a radial plate secured upon the spindle and forming a radial piston within the cylinder, the block and the plate dividing the interior of the drum into two chambers which vary in relative size as the spindle with the plate oscillates within the drum, substantially as described and for the purpose set forth.

3. In an hydraulic shock absorber of the general construction described a block rigidly fastened within the drum and forming an abutment across the space between the walls of same and having two through passages the one a comparatively small one into which projects the end of a setscrew whereby its effective size may be varied, and the other one a comparatively large one at the one end of which is a ball valve held by a retaining device in an enlarged portion of the passage, said passage being also fitted with a setscrew which may be set to more or less close the passage as desired, substantially as described and for the purpose set forth.

In testimony that I claim the foregoing as my invention I have signed my name this 20th day of September, 1926.

WILLIAM PATRICK MASON.